(12) United States Patent
Hosono et al.

(10) Patent No.: US 11,809,525 B2
(45) Date of Patent: Nov. 7, 2023

(54) LIST GENERATION DEVICE, PHOTOGRAPHIC SUBJECT IDENTIFICATION DEVICE, LIST GENERATION METHOD, AND PROGRAM

(71) Applicant: NIPPON TELEGRAPH AND TELEPHONE CORPORATION, Tokyo (JP)

(72) Inventors: Takashi Hosono, Tokyo (JP); Yukito Watanabe, Tokyo (JP); Jun Shimamura, Tokyo (JP); Atsushi Sagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 154 days.

(21) Appl. No.: 17/312,367

(22) PCT Filed: Dec. 2, 2019

(86) PCT No.: PCT/JP2019/047005
§ 371 (c)(1),
(2) Date: Jun. 9, 2021

(87) PCT Pub. No.: WO2020/121866
PCT Pub. Date: Jun. 18, 2020

(65) Prior Publication Data
US 2022/0019841 A1   Jan. 20, 2022

(30) Foreign Application Priority Data
Dec. 11, 2018   (JP) .................................. 2018-231867

(51) Int. Cl.
*G06F 18/22*   (2023.01)
*G06F 16/55*   (2019.01)
(Continued)

(52) U.S. Cl.
CPC ............ *G06F 18/22* (2023.01); *G06F 16/532* (2019.01); *G06F 16/55* (2019.01); *G06F 18/231* (2023.01);
(Continued)

(58) Field of Classification Search
CPC ........ G06F 18/22; G06F 16/532; G06F 16/55; G06F 18/231; G06F 18/241;
(Continued)

(56) References Cited

U.S. PATENT DOCUMENTS 7,764,808 B2 *   7/2010   Zhu ....................... G06V 10/255
                                                              382/104
8,352,465 B1 *   1/2013   Jing ......................... G06F 16/50
                                                              707/723
(Continued)

FOREIGN PATENT DOCUMENTS

JP   2009251705 A   10/2009
JP   2015138349 A    7/2015
(Continued)

*Primary Examiner* — Kathleen Y Dulaney

(57) ABSTRACT

A list for accurately identifying objects with different sizes that are the same attributes can be generated automatically. A classification unit classifies, from a group of images consisting of images including objects with any of a plurality of attributes, each of the images including the objects that have an identical attribute and have different real sizes into an identical cluster. An output unit outputs each of clusters into which at least two of the images are classified as a list of images with different real sizes of the objects for the identical attribute.

14 Claims, 6 Drawing Sheets

(51) Int. Cl.
  *G06F 16/532* (2019.01)
  *G06V 10/98* (2022.01)
  *G06T 7/60* (2017.01)
  *G06F 18/231* (2023.01)
  *G06F 18/241* (2023.01)
(52) U.S. Cl.
  CPC .............. *G06F 18/241* (2023.01); *G06T 7/60* (2013.01); *G06V 10/98* (2022.01)
(58) Field of Classification Search
  CPC ............ G06F 16/583; G06T 7/60; G06T 2207/30128; G06T 7/62; G06V 10/98; G06V 10/46; G06V 10/762; G06V 20/52
  USPC .................. 382/225, 103; 707/737
  See application file for complete search history.

(56) References Cited

U.S. PATENT DOCUMENTS

| | | | | |
|---|---|---|---|---|
| 9,639,806 | B2* | 5/2017 | Zhang | G06V 20/47 |
| 9,654,654 | B1* | 5/2017 | Jing | H04N 1/00442 |
| 10,002,310 | B2* | 6/2018 | Gopalan | G06F 18/23 |
| 11,126,653 | B2* | 9/2021 | Zhai | G06F 16/248 |
| 2007/0058836 | A1* | 3/2007 | Boregowda | G06V 20/52 |
| | | | | 382/103 |
| 2007/0174269 | A1* | 7/2007 | Jing | G06F 16/58 |
| | | | | 707/999.005 |
| 2015/0149952 | A1* | 5/2015 | Baheti | G06F 3/04883 |
| | | | | 715/780 |
| 2015/0206119 | A1* | 7/2015 | Urushibata | G06Q 20/204 |
| | | | | 382/103 |
| 2015/0294191 | A1* | 10/2015 | Zhang | G06T 7/0002 |
| | | | | 382/160 |
| 2016/0110630 | A1* | 4/2016 | Heusch | G06V 10/765 |
| | | | | 382/160 |
| 2017/0154302 | A1* | 6/2017 | Streebin | B64C 39/024 |
| 2018/0322512 | A1* | 11/2018 | Sheth | G06F 16/583 |
| 2019/0026999 | A1* | 1/2019 | Kinno | G07G 1/0063 |
| 2019/0279394 | A1* | 9/2019 | Yonezawa | G06T 7/00 |

FOREIGN PATENT DOCUMENTS

| | | |
|---|---|---|
| JP | 2015201123 A | 11/2015 |
| WO | 2018016214 A1 | 1/2018 |

\* cited by examiner

LIST GENERATION DEVICE, PHOTOGRAPHIC SUBJECT IDENTIFICATION DEVICE, LIST GENERATION METHOD, AND PROGRAM

CROSS-REFERENCE TO RELATED APPLICATIONS

This application is a U.S. 371 Application of International Patent Application No. PCT/JP2019/047005, filed on 2 Dec. 2019, which application claims priority to and the benefit of JP Application No. 2018-231867, filed on 11 Dec. 2018, the disclosures of which are hereby incorporated herein by reference in their entireties.

TECHNICAL FIELD

The present invention relates to a list generation apparatus, an object identification apparatus, a list generation method, and programs, and particularly relates to a list generation apparatus, an object identification apparatus, a list generation method, and programs for identifying an object included in an image.

BACKGROUND ART

Object identification to identify the type of an object captured in an image has a wide range of industrial applicability, such as application to searches for signs or products using images. Objects that can be targets of the object identification include products such as beverages of the same type with only different volumes, which are products with substantially the same design but different sizes. It is important to accurately distinguish such products from each other in object identification given that pieces of relevant information such as prices of the products differ depending on sizes. However, because such objects that are different in size look similar in an image, it is difficult in normal object identification (e.g., the approach described in Patent Literature 1) to determine the type of an object based on image features to discern objects having different sizes.

CITATION LIST

Patent Literature

Patent Literature 1: Japanese Unexamined Patent Application Publication No. 2015-201123

SUMMARY OF THE INVENTION

Technical Problem

Misrecognition may occur in an approach for identifying an object based on image features.

As a method for solving the problems described above, there is an approach of comparing the real size of an object obtained from the actual dimensional ratio between the pixels and the object in a query image to the real size of each object to be identified in an object DB. In this approach, a size difference list is required as preliminary information indicating a size difference relationship between the actual size (real size) per pixel in the query image and an object.

However, the aforementioned preliminary information may be difficult to acquire from the perspective of restrictions imposed at the time of photographing or manpower costs. For example, in order to acquire an actual size per pixel in a query image, a restriction such as utilizing a special sensor such as a depth sensor or photographing a specific object that will serve as a reference of size to be included in an image is needed at the time of photographing. Furthermore, in a case of an artifact such as a product, although it is often possible to append size information to an object DB using data created when designing the product, or the like, size differences of each object are not able to be managed in most cases, and appending such information manually is considered to be difficult due to high manpower costs.

The present invention has been conceived taking the above circumstances into account and aims to automatically generate a list for accurately identifying objects having identical attributes and different sizes.

In addition, the present invention aims to provide an object identification apparatus and a program that can accurately identify objects having identical attributes and different sizes.

Means for Solving the Problem

In order to achieve the above-described objectives, a list generation apparatus according to a first invention is configured to include a classification unit configured to classify, from a group of images consisting of images including objects with any of a plurality of attributes, each of the images including the objects that have an identical attribute and have different real sizes into an identical cluster, and an output unit configured to output each of clusters into which at least two of the images are classified as a list of images with different real sizes of objects for the identical attribute.

In addition, in the list generation apparatus according to the first invention, the classification unit may perform, for respective images included in the group of images, the classification such that images classified as having an identical attribute are classified into an identical cluster based on at least an image feature of an object captured in the image among the image feature and a text feature relating to the object, regardless of a real size of the object.

Further, in the list generation apparatus according to the first invention, the output unit may associate, in each of the clusters, a real size that is given in advance to an object included in the image classified into the cluster with identification information of the image, and output the associated identification information as the list.

An object identification apparatus according to a second invention is configured to include an object identification unit configured to identify, using a query image as an input, an object included in the query image based on a group of images consisting of images including objects with any of a plurality of attributes, and an identification result correction unit configured to correct an identification result based on a real size of an object estimated for the query image and a real size of an object included in an image of an identical cluster to that of the identified object among clusters included in the list output by the list generation apparatus in the first invention to estimate an object included in the query image.

The object identification apparatus according to the second invention may further include an actual dimensional ratio estimation unit configured to calculate, with the query image including three or more objects, for each of the objects of the query image, an actual dimensional ratio based on a size of the object in the query image and a real size of the identified object and to estimate an actual dimensional ratio of the object included in the query image based on the calculation result, in which the identification result correction unit may estimate a real size of the object of the query image based on the estimated actual dimensional ratio.

A list generation method according to a third invention is executed by including a step of classifying, at a classification unit, from a group of images consisting of images including objects with any of a plurality of attributes, each of the images including the objects that have an identical attribute and have different real sizes into an identical cluster and a step of outputting, at an output unit, each of clusters into which at least two of the images are classified as a list of images with different real sizes of objects for the identical attribute.

In addition, a program according to a fourth invention is a program for causing a computer to function as a unit of the list generation apparatus according to the first invention.

In addition, a program according to a fifth invention is a program for causing a computer to function as a unit of the object identification apparatus according to the second invention.

Effects of the Invention

According to the list generation apparatus, the method, and the program of the present invention, it is possible to obtain the effect of automatically generating a list for identifying objects that have an identical attribute having different sizes with accuracy.

In addition, according to the object identification apparatus and the program, it is possible to obtain the effect of identifying objects that have an identical attribute having different sizes with accuracy.

DESCRIPTION OF EMBODIMENTS

Hereinafter, embodiments of the present invention will be described in detail with reference to the drawings.

Overview of Embodiment of Present Invention

First, an overview of an embodiment of the present invention will be described.

Figure 1:
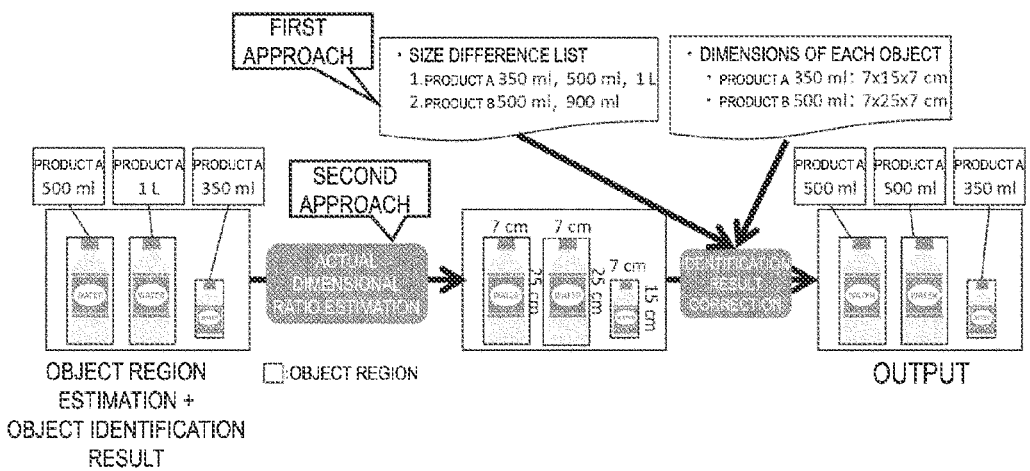
FIG. 1 is a diagram illustrating an example of a case in which the result of object identification is corrected and an actual dimensional ratio is estimated.

General correction of identification results of objects as illustrated in FIG. 1 is conceivable as an approach of the first embodiment. A size difference list is utilized as preliminary information for correction, and the size difference list is automatically acquired. The size difference list will be described below. Furthermore, real sizes of objects obtained from an input actual dimensional ratio that is an actual dimension per pixel are compared with real sizes of the objects included in the size difference list for the objects output in identification results. A real size refers to an actual dimension of an object. By selecting an object having an appropriate size from the comparison results, the identification results can be corrected to gain a correct size of an object. In addition, as an approach of a second embodiment, it is conceivable to estimate an actual dimensional ratio of an object using an actual dimensional ratio obtained from actual dimensions of objects in a query image. In this way, by comparing the real size of an object in the query image with the real size stored in an object DB, size matching in the identification results can be verified.

That is, in currently available techniques for identifying an object based on feature amounts of an image extracted using an edge or the like, objects having identical attributes are identified as the same object even if they have different real sizes. Embodiments of the present invention utilize the nature of currently available object identification technology.

The approach of the first embodiment has a mechanism for automatically generating a size difference list. By utilizing the characteristic that objects with different sizes look similar in an image, a list of objects with difference sizes is automatically generated by considering objects having a high degree of similarity in an image registered in the object DB as objects with different sizes. In addition, a mechanism for correcting a result of object identification by selecting an object having an appropriate size from a size difference list based on the real size of an object in the query image obtained using an input actual dimensional ratio may be provided. However, it is desirable to be able to distinguish objects having different sizes without preparing such a size difference list.

In addition, an approach of the second embodiment also has a mechanism for automatically estimating an actual dimensional ratio in a query image. In this mechanism, it is assumed that there are a plurality of objects in a query image and an identification result for the plurality of objects is substantially correct, an object region in the query image is compared with an actual dimension of the object in the identification result, and thereby an actual dimensional ratio is estimated. As a result, it is desired to be able to estimate the actual dimensional ratio without using a special sensor or the like.

Configurations and operations of the embodiments will be described below with respect to the above-described approaches of the embodiments. Note that, in the embodiments, a case in which a product name is used as an example of an attribute will be described.

Figure 2:
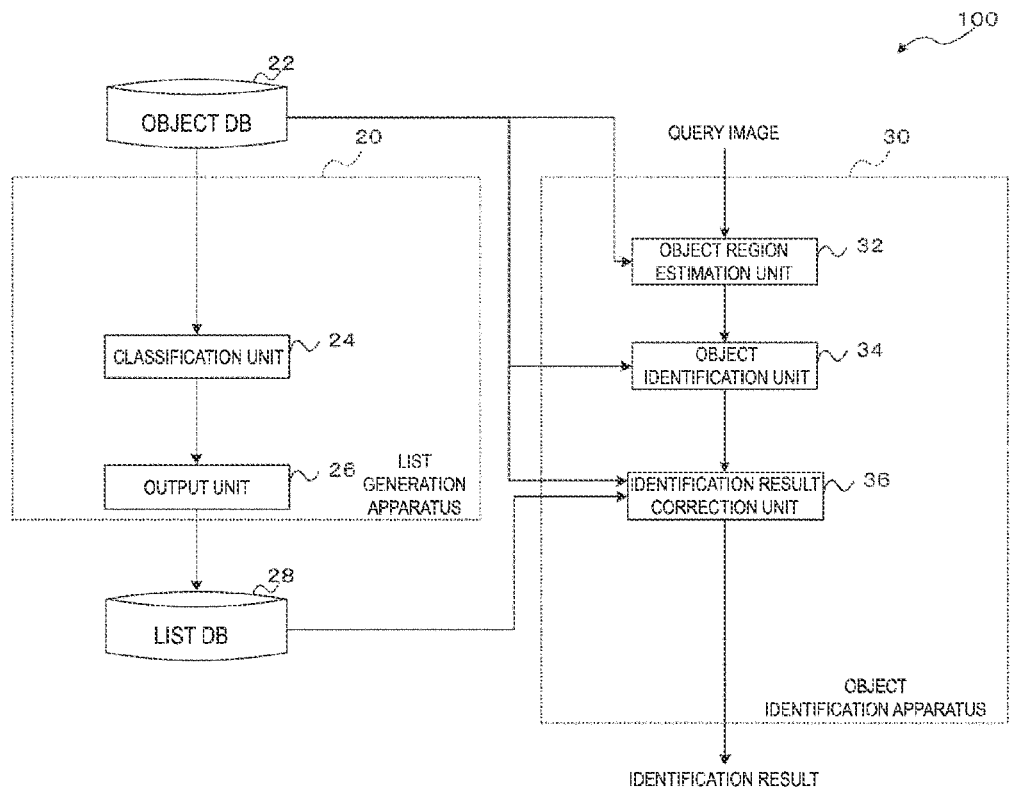
FIG. 2 is a block diagram illustrating a configuration of an object identification system including a list generation apparatus and an object identification apparatus according to a first embodiment of the present invention.

Configuration and Operation of Object Identification System According to First Embodiment of Present Invention Next, a configuration of an object identification system according to an embodiment of the present invention will be described. An object identification system 100 according to the embodiment of the present invention includes an object DB 22, a list generation apparatus 20, a list DB 28, and an object identification apparatus 30 as illustrated in FIG. 2. The list generation apparatus 20 and the object identification apparatus 30 can be configured respectively as a computer including a CPU, a RAM, and a ROM that stores programs and various kinds of data.

The object DB 22 is an group of images consisting of images including objects with any of a plurality of products to be identified, and stores a group of images including images in which each of products having different sizes is an object, product names (labeled names) of the products that are objects included in the images, label IDs of the objects, and sizes of the objects. Although a size of an object is a width and a height, a depth may be added. Each image is assumed to include objects with different product names and different sizes. The list generation apparatus 20 uses the object DB 22 to generate a list. The generated list is a size difference list in which objects in images are assumed to be the same products having different sizes if image features of the image are similar. In addition, the object identification apparatus 30 performs object identification with reference to the object DB 22 and the list DB 28.

First, the list generation apparatus 20 will be described.

The list generation apparatus 20 is configured to include a classification unit 24 and an output unit 26.

The classification unit 24 classifies each of images with objects that are the same type of product and have different real sizes from the group of images of the object DB 22 into the same clusters. In the present embodiment, degrees of similarity of the images included in the group of images of the object DB 22 are calculated, and similar images are classified into the same clusters.

Processing of (1) extraction of features and (2) clustering is performed in the classification by the classification unit 24, and will be described in detail below.

The classification unit 24 first extracts image features from each of images including objects of the object DB 22. Here, prominent items can be used as image features to be extracted. For example, a SIFT feature amount used in Reference 1 or the like can be used.

[Reference 1] D. G. Lowe, "Distinctive Image Features from Scale-Invariant Keypoints," International Journal of Computer Vision, No. 2004, vol. 60, pp. 91-110, 2004.

Next, the classification unit 24 calculates the similarity in the image features obtained in the feature extraction for all combinations of image pairs obtained from the object DB 22, and clusters images which are images with calculated high degrees of similarity when object identification is performed as the same cluster. At this time, prominence measurement be adopted to calculate the degree of similarity. For example, a degree of similarity of an image pair output through scoring, as introduced in Patent Literature 1, may be used. In addition, a degree of similarity calculated taking a class of a general object output in Reference 2 into consideration may be used. For example, in a case in which the classes of general objects (PET bottles, cans, and the like) between objects A and B are different, processing of setting a degree of similarity to 0 is assumed.

[Reference 2] J. Redmon, A. Fradai, "YOLO9000: Better, Faster, Stronger," in CVPR, 2017.

Figure 3:
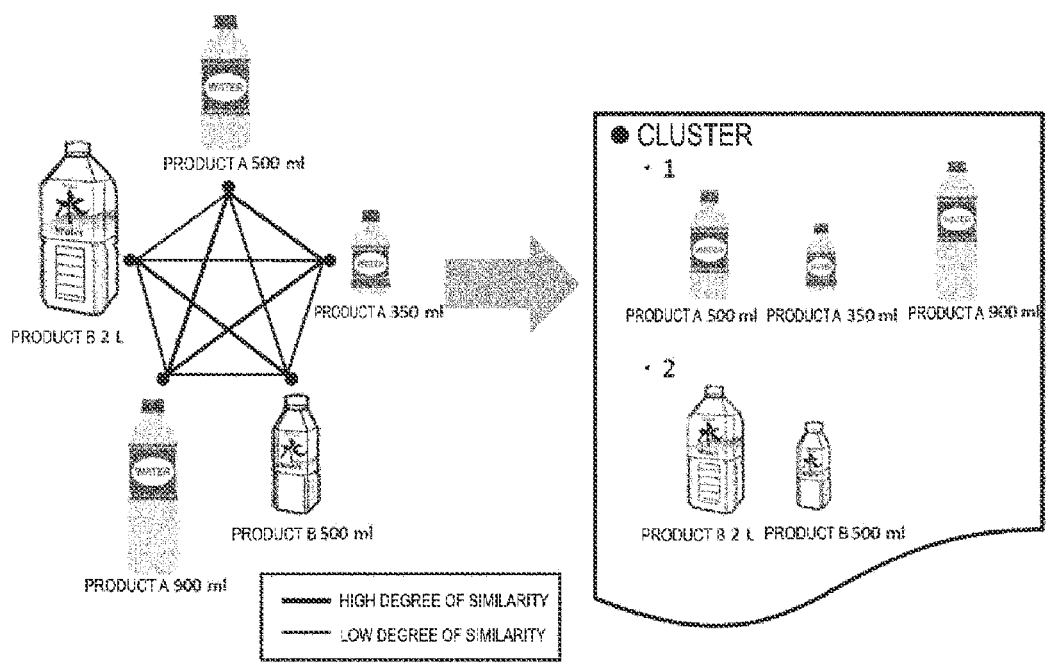
FIG. 3 is a diagram illustrating an example of a relationship between each product and the degree of similarity.

Then, the classification unit 24 registers a pair of images having a certain degree of similarity or higher in the size difference list, regarding the pair as having a size difference. FIG. 3 illustrates an example of a relationship between each product and the degree of similarity. For example, when there are objects A, B, and C, if degrees of similarity between the objects A and B and the objects B and C are high, the objects A, B, and C are classified into the same cluster. Here, in order to generate a size difference list with fewer errors, if a degree of similarity between objects A and C is low, processing of classifying the objects A and B and the objects B and C into the same clusters respectively may be added without integrating the objects.

Also, for example, if objects are beverage products, there are cases in which products with different flavors produced by the same manufacturer have the same logo and a degree of similarity of the products in terms of image features is high, and thus there is concern that different products may be classified into the same cluster. In this case, clustering may be performed taking the degree of similarity between the product names (label names) into account, in addition to the image features. Specifically, processing may be performed such that a degree of similarity between product names is defined using a normalized Levenshtein distance or the like, pairs having a high degree of similarity in both images and product names are integrated and classified into one cluster, and a pair having a low degree of similarity in either of them is put into another cluster. Note that the product names (label names) are given as text data from the object DB 22. Even if product names are known, a case in which it is difficult to distinguish products with different flavors, for example, beverage products, from each other is assumed when only textual processing is applied, and image features and textual processing of the product names need to be used together. In addition, it may be difficult to determine whether products have the same attributes only based on their product names due to variation in notation of the product names (e.g., "KAROWASU," "KA.RO.WA.SU," "KAROWASU 500 ml," "Cola KAROWASU," etc.).

The output unit 26 registers each cluster into which at least two images are classified in the list DB 28 as a size difference list for images of objects that are the same products having different real sizes.

The size difference list specifically lists label IDs for each cluster using label IDs which are identification information associated with objects included in images. For example, if there are three clusters, a list of label IDs for the respective clusters may be "46077600, 46039458, 46723984/ 46059295, 46039402, 46075392/46094234, 46593243 (the slashes indicate clusters)." In addition, cluster IDs may be assigned. In addition, the output unit 26 may also associate, for each of the clusters, a real size (width and height) given in advance to an object included in an image classified into the cluster with a label ID, and output the associated identification information as a size difference list. For example, if a width is associated with a height as a size, a size difference list including "46077600, (7 cm:25 cm), 46039458, (7 cm:15 cm), . . . " is created.

Next, the object identification apparatus 30 will be described.

The object identification apparatus 30 is configured to include an object region estimation unit 32, an object identification unit 34, and an identification result correction unit 36.

The object region estimation unit 32 estimates an object region included in an input query image. For estimation of a region, a prominent object such as a rectangle output according to Non Patent Literature 1, a region of each pixel output according to Reference 3, or the like can be used.

[Reference 3] O. Pedro et. al., "Learning to Refine Object Segments," in ECCV, 2016.

Note that there may be a plurality of object regions estimated by the object region estimation unit 32, and processing is performed on each of the object regions below.

The object identification unit 34 identifies an object included in the query image based on a group of images consisting of images including any object among a plurality of objects stored in the object DB 22, using the object region estimated from the query image by the object region estimation unit 32 as an input. Specifically, the object identification unit 34 performs object identification (e.g., the approach described in Reference 1) regarding each object region as one image and outputs, as the identification result, the result of which object corresponds to an object of images registered in the object DB 22 or the result that each object corresponds to none of objects of the images to the identification result correction unit 36.

The identification result correction unit 36 corrects the object identified by the object identification unit 34 for each identification result of the object. The flow will be described below.

First, the identification result correction unit 36 estimates the real size of the object of the query image to be identified using the actual dimensional ratio, which is the actual size per pixel, that is input together with the query image, and the size of the object region. Next, the identification result correction unit corrects the identification result based on the estimated real size of the object of the query image and the real size of the object included in the image of the same cluster as that of the identified object among the clusters included in the list DB 28, and estimates an object included in the query image. Then, the identification result correction unit 36 outputs the position, the label name, and the real size of the estimated object included in the query image as a final identification result.

Specifically, the identification result correction unit 36 corrects the result of the object identification unit 34 by investigating which of the object identified by the object identification unit 34 and objects having a different size from the aforementioned object has a size closest to the real size indicated by the object region in the query image. A corrected object o' is estimated using the following equation (1).

[Math. 1]
$$o' = \underset{o \in O}{\mathrm{argmin}}\, D(s^o, s^q) \quad (1)$$

Here, o represents an object identified by the object identification unit 34, and O represents a collection of objects on the size difference list of the list DB 28, having different sizes from the aforementioned object. In addition, $s^o$ represents a real size of an object corresponding to the object o, and $s^q$ is an estimated real size of the object in a query image. Although $s^q$ is estimated based on the actual dimensional ratio that is the actual size per pixel of the query image, the estimation method will be described below.

Figure 4:
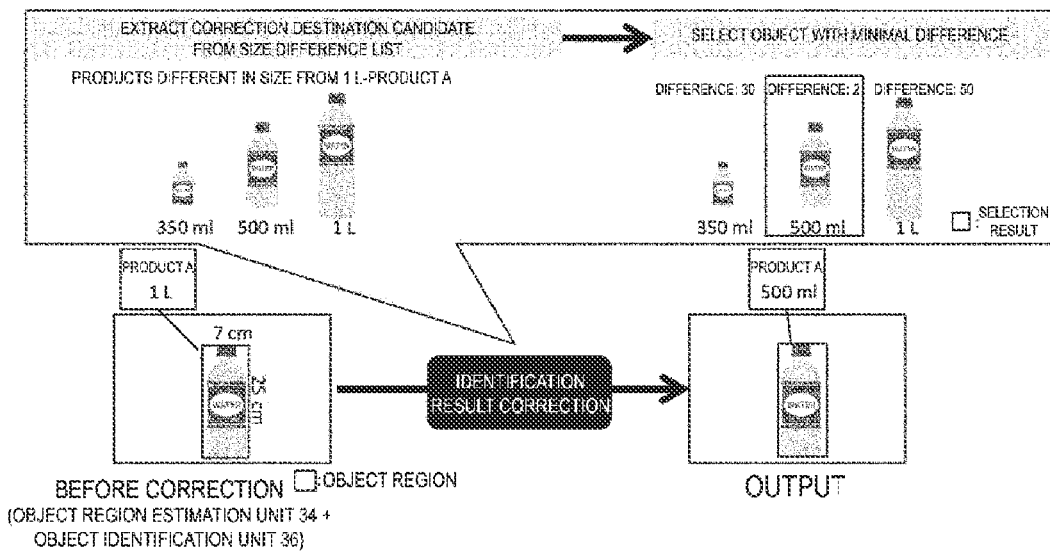
FIG. 4 is a diagram illustrating an example in which an identification result is corrected.

The identification result correction unit estimates, as an identification result, the object with the smallest difference between $s^O$ and $s^q$ using equation (1) above. FIG. 4 illustrates an example in which an identification result is corrected.

The function D of equation (1) above will be described. The function D is a function for defining a real size length, e.g. defined by equation (2) below.

[Math. 2]
$$D(s^o, s^q) = \frac{|s_h^o - s_h^q|}{s_h^o} + \frac{|s_w^o - s_w^q|}{s_w^o} \quad (2)$$

Here, $s_h^o$ represents a real height of an object corresponding to an object o, and $s_w^o$ represents a real width of the object corresponding to the object o. Also, $s_h^q$ represents a real height of an object in a query image, $s_w^q$ represents a real width of the object in the query image, and the values are estimated as real sizes. $s_h^q$ and $s_w^q$ are estimated using $s_h^q = r_h b_h^q$ and $s_w^q = r_w b_w^q$, respectively, using an actual dimensional ratio $r_h$ of the pixels of the query image in the vertical direction, an actual dimensional ratio $r_w$ of the pixels of the query image in the horizontal direction, a height $b_h^q$ of an object region in the query image, and a width $b_w^q$ of the object region in the query image. It is assumed that $r_h$ and $r_w$ are given at the time of input as preliminary information of the query image. In addition to the above, the function D may be defined using an outer circumference $(s_w^o + s_h^o)$, an aspect ratio $(s_w^o/s_h^o)$, or the like of a real size. If an aspect ratio is used, aspect ratios may be accidentally matched between elements having different sizes, and thus sizes need to be used in combination from the perspective of accuracy. In addition, although it is conceivable to use a depth in estimating a real size from an image, information other than pixels such as depth maps needs to be stored in the object DB 22.

As described above, according to the processing of the identification result correction unit 36, it is possible to perform correction to an identification result of an object with an appropriate size.

Next, an operation of the object identification system 100 according to an embodiment of the present invention will be described.

Figure 5:
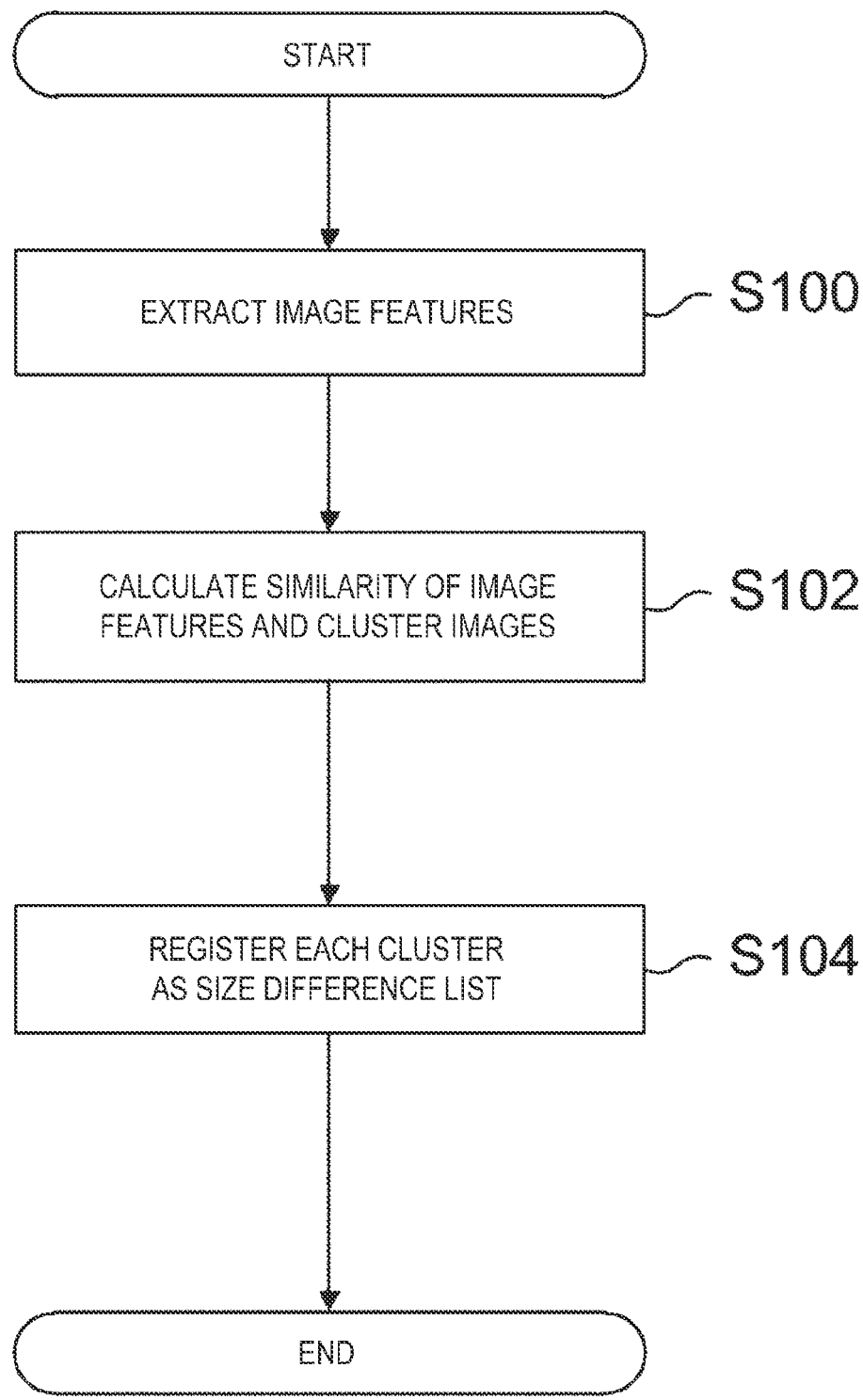
FIG. 5 is a flowchart showing a processing routine of the list generation apparatus according to the first and second embodiments of the present invention.

First, an operation of the list generation apparatus 20 will be described using the flowchart shown in FIG. 5.

In step S100, the classification unit 24 extracts image features from each of images including objects of the object DB 22.

In step S102, the classification unit 24 calculates the similarity of the image features obtained in the feature extraction for all combinations of the image pairs obtained from the object DB 22, and clusters the images by performing object identification using the calculated degree of similarity. In this way, the classification unit 24 classifies each of the images including objects that are the same products and have different real sizes from the group of images of the object DB 22 into the same cluster.

In step S104, the output unit 26 registers each cluster into which at least two images are classified in the list DB 28 as a size difference list for images of objects that are the same products having different real sizes.

Figure 6:
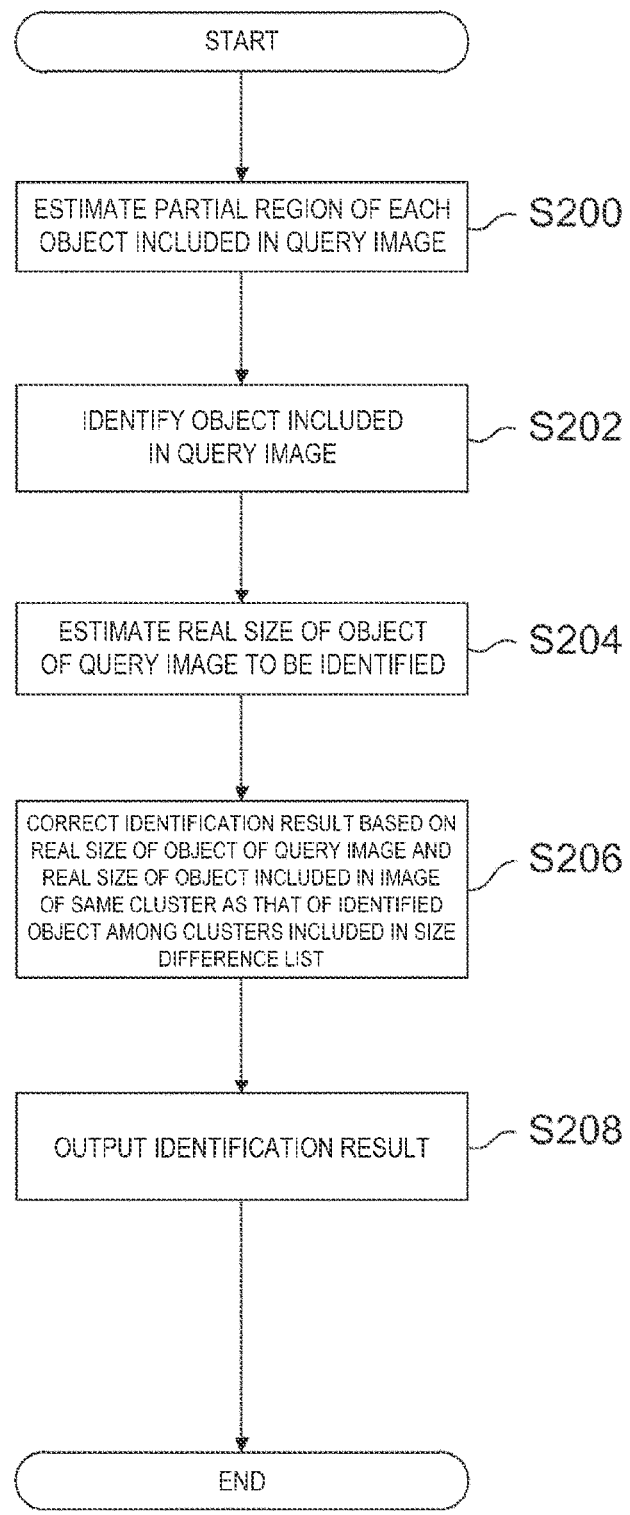
FIG. 6 is a flowchart showing a processing routine of the object identification apparatus according to the first embodiment of the present invention.

Next, an operation of the object identification apparatus 30 will be described using the flowchart shown in FIG. 6.

In step S200, the object region estimation unit 32 estimates an object region included in an input query image.

In step S202, the object identification unit 34 identifies an object included in the query image based on a group of images consisting of images including objects with any of a plurality of products stored in the object DB 22, using the object region estimated from the query image by the object region estimation unit 32 as an input.

In step S204, the identification result correction unit 36 estimates the real size of the object of the query image to be identified using the actual dimensional ratio, which is the actual size per pixel, that is input together with the query image, and the size of the object region. The estimation of the object size is performed based on the actual dimensional ratio of the pixels of the query image in the vertical direction and the actual dimensional ratio $r_w$ of the pixels of the query image in the horizontal direction given as preliminary information of the query image, the height $b_h^q$ of the object region in the query image, and the width $b_w^q$ of the object region in the query image.

In step S206, the identification result correction unit 36 corrects the identification result according to the above-described equation (1) based on the real size of the object of the query image estimated in step S204 and the real size of the object included in an image of the same cluster as the identified object among the clusters included in the size difference list of the list DB 28, and estimates the object included in the query image.

In step S208, the identification result correction unit 36 outputs the position, the product name, and the real size of the object included in the query image estimated in step S206 as a final identification result.

According to the first embodiment of the present invention as described above, images including objects that are the same products and have different real sizes are classified into the same cluster, each of the clusters is set as a size difference list for images including objects that are the same products but have difference real sizes, and thereby the size difference list used to accurately identify products with different sizes can be generated.

Furthermore, the identification result is corrected based on the size of the object of the query image and the real size of the object included in the image of the same cluster as the identified object among the clusters included in the size difference list, the identification result is corrected by estimating the object included in the query image, and thus products with different sizes can be identified with accuracy.

Configuration and Operation of Object Identification System According to Second Embodiment of Present Invention Next, a configuration of an object identification system according to a second embodiment of the present invention will be described. Note that parts similar to those of the first embodiment are denoted by the same reference numerals, and descriptions thereof will be omitted.

The second embodiment is an approach for accurately obtaining an actual dimensional ratio of pixels of a query image (hereinafter simply referred to as an actual dimensional ratio) when the query image includes three or more objects, and there is no need to input the actual dimensional ratios $r_h$ and $r_w$, which are preliminary information of the query image. Thus, it is desirable to be able to perform object identification in which size differences can be discerned in various query images without inputting actual dimensional ratios in advance in conditions in which a depth sensor is used, a reference object is captured, or the like.

Figure 7:
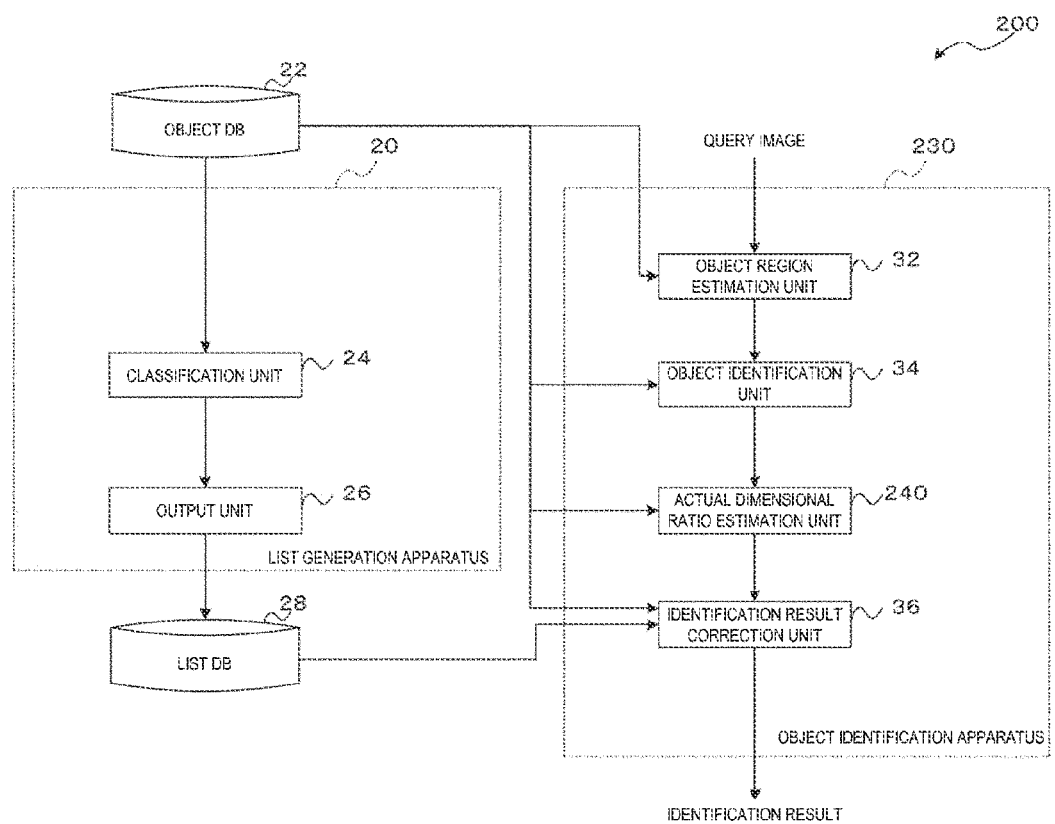
FIG. 7 is a block diagram illustrating a configuration of an object identification system including a list generation apparatus and an object identification apparatus according to the second embodiment of the present invention.

An object identification system 200 according to the embodiment of the present invention is configured to include an object DB 22, a list generation apparatus 20, a list DB 28, and an object identification apparatus 230 as illustrated in FIG. 7.

The object identification apparatus 230 is configured to include an object region estimation unit 32, an object identification unit 34, an actual dimensional ratio estimation unit 240, and an identification result correction unit 36.

The actual dimensional ratio estimation unit 240 calculates, for each of objects of a query image, an actual dimensional ratio based on the size of the object in the query image and the real size of the object identified by the object identification unit 34. Then, the actual dimensional ratio of the object included in the query image is estimated based on the calculation result of each object.

Processing by the actual dimensional ratio estimation unit 240 is an approach of estimating an actual dimensional ratio on the assumption that the identification result for each object of the object identification unit 34 is approximately correct for each object region in the query image. Specifically, an actual dimensional ratio $r_h^q$ of a certain object region q in the vertical direction is calculated according to the following equation (3).

[Math. 3]

$$r_h^q = \frac{s_h^q}{b_h}  \quad (3)$$

Figure 8:
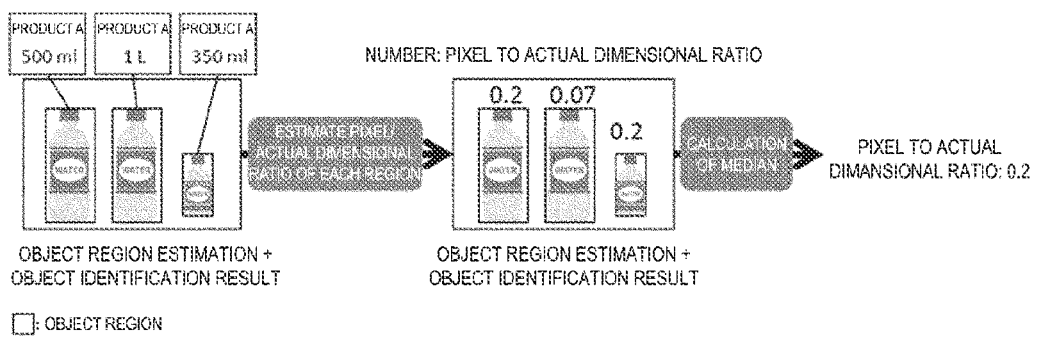
FIG. 8 is a diagram illustrating an example of processing for estimating an actual dimensional ratio.

Then, the final actual dimensional ratio $r_h$ is calculated from $r_h^q$ calculated from each of the object regions. For example, the median is calculated and determined based on the fact that the result of the object identification unit 34 includes some recognition errors. Furthermore, the actual dimensional ratio $r_w^q$ in the horizontal direction may be calculated similarly to the $r_h^q$ in equation (3) above, or the value of $r_h^q$ may be used as is. FIG. 8 is a diagram illustrating an example of processing for estimating an actual dimensional ratio.

The identification result correction unit 36 estimates the real sizes of objects of a query image based on the actual dimensional ratios estimated by the actual dimensional ratio estimation unit 240.

Figure 9:
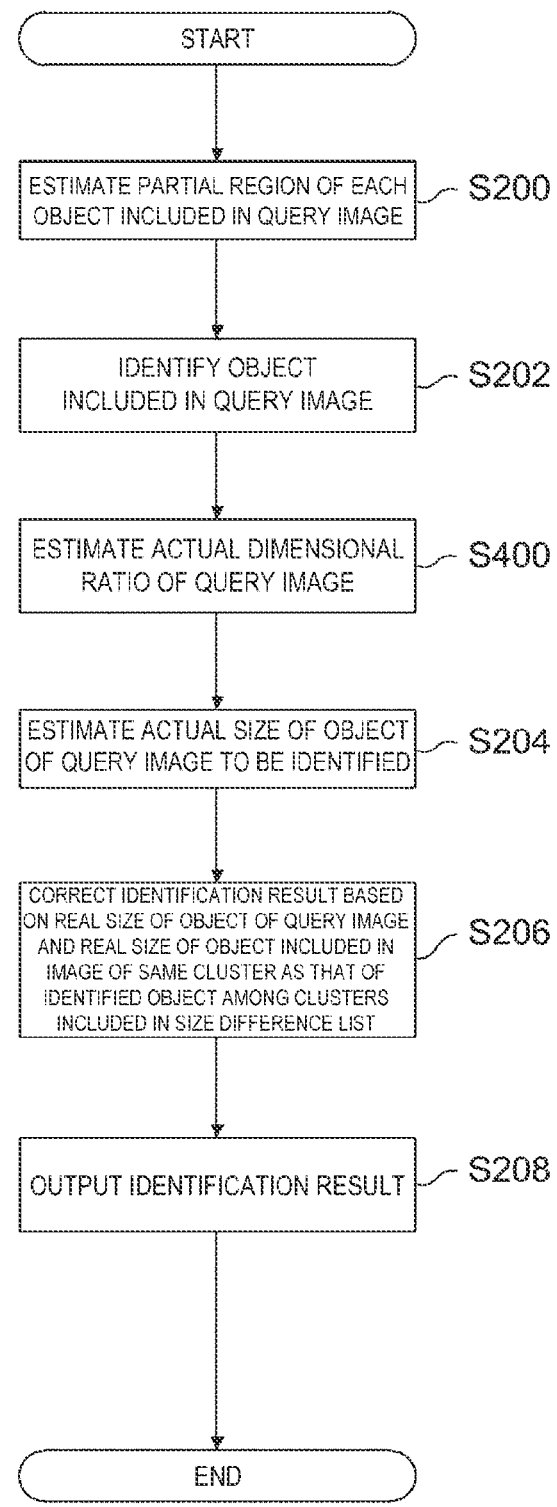
FIG. 9 is a flowchart showing a processing routine of the object identification apparatus according to the second embodiment of the present invention.

Also, an operation of the object identification apparatus according to the second embodiment is shown in the flowchart of FIG. 9. In step S400 after step S202, the actual dimensional ratio estimation unit 240 calculates actual dimensional ratios based on the sizes of objects in the query image and the real sizes of the objects identified by the object identification unit 34. Then, the actual dimensional ratio of the object included in the query image is estimated based on the calculation result of each object.

In step S204, the identification result correction unit 36 estimates the real sizes of the objects to be identified for the query image based on the actual dimensional ratios estimated in step S400. The estimation of the object sizes is performed based on the actual dimensional ratios $r_h^q$ and $r_w^q$ estimated in step S400, the height $b_h^q$ of the object region in the query image, and the width $b_w^q$ of the object region in the query image.

As described above, according to the second embodiment of the present invention, when three or more objects are included in a query image, the actual dimensional ratios in the query image can be accurately obtained.

Note that the present invention is not limited to the above-described embodiments, and various modifications and applications may be made without departing from the gist of the present invention.

For example, although the case in which an attribute of an object is set as product name has been described as an example in the embodiments described above, the present invention is not limited thereto, and a name indicating a target object or the like may be used.

Moreover, although the case in which the list generation apparatus and the object identification apparatus are configured as one unit as the object identification system has been described as an example, the present invention is not limited thereto, and each of the apparatuses may be configured to be separate portions.

REFERENCE SIGNS LIST

20 List generation apparatus
24 Classification unit

26 Output unit
30 Object identification apparatus
32 Object region estimation unit
34 Object identification unit
36 Identification result correction unit
100, 200 Object Identification system
230 Object identification apparatus
240 Actual dimensional ratio estimation unit

The invention claimed is:

1. A list generation apparatus comprising a processor configured to execute a method comprising:
   extracting a first feature from a first image of a plurality images, wherein the first image indicates a first object, and wherein the first feature is associated with a first attribute of the first object;
   extracting a second feature from a second image of the plurality of images, wherein the second image indicates a second object, the second object is distinct from the first object, and the second feature is associated with a second attribute of the second object;
   classifying a combination including the first image and the second image into a cluster of image data, wherein the first attribute and the second attribute are identical, and wherein a first real size of the first object is distinct from a second real size of the second object;
   generating, based on the cluster of image data, a list of information describing attributes of objects, wherein the list includes information of distinct objects with an identical attribute and in different real sizes;
   identifying, using a query image as an input, a third object included in the query image based on a group of images including images including objects with any of a plurality of attributes;
   updating, based on the first real size of the first object in the list, a size information of the third object with the first real size of the first object, wherein the third object is classified into the cluster of image data based on a third attribute of the third object being identical to the first attribute of the first object;
   calculating, based on the query image including three or more query objects, for each of the query objects of the query image, an actual dimensional ratio based on a size of a query object in the query image and the size information of the third object; and
   determining, based on the actual dimensional ratio, a real size of the query object included in the query image.

2. The list generation apparatus according to claim 1, wherein the first attribute is based at least on either an image feature or a textual feature associated with the first object in the first image, and the cluster includes the first image and the second image regardless of a difference between the first real size and the second real size.

3. The list generation apparatus according to claim 2, wherein the list further includes data representing a predetermined size of the first object and identification information associated with the first image.

4. The list generation apparatus according to claim 1, wherein the first attribute of the first object includes a product name of the first object.

5. The list generation apparatus according to claim 1, wherein the classifying uses a normalized Levenshtein distance to classify the combination including the first image and the second image.

6. A list generation method comprising:
   extracting a first feature from a first image of a plurality images, wherein the first image indicates a first object, and wherein the first feature is associated with a first attribute of the first object;
   extracting a second feature from a second image of the plurality of images, wherein the second image indicates a second object, the second object is distinct from the first object, and the second feature is associated with a second attribute of the second object;
   classifying a combination including the first image and the second image into a cluster of image data, wherein the first attribute and the second attribute are identical, and wherein a first real size of the first object is distinct from a second real size of the second object;
   generating, based on the cluster of image data, as a list of information describing attributes of objects, wherein the list includes information of distinct objects with an identical attribute and in different real sizes;
   identifying, using a query image as an input, a third object included in the query image based on a group of images including images including objects with any of a plurality of attributes;
   updating, based on the first real size of the first object in the list, a size information of the third object with the first real size of the first object, wherein the third object is classified into the cluster of image data based on a third attribute of the third object being identical to the first attribute of the first object;
   determining, based on the query image including three or more query objects, for each of the query objects of the query image, an actual dimensional ratio based on a size of a query object in the query image and the size information of the third object; and
   determining, based on the actual dimensional ratio, a real size of the query object included in the query image.

7. The list generation method according to claim 6, wherein the first attribute is based at least on either an image feature or a textual feature associated with the first object in the first image, and the cluster includes the first image regardless of a difference between the first real size and the second real size.

8. The list generation method according to claim 7, wherein the list further includes data representing a predetermined size of the first object and identification information associated with the first image.

9. The list generation method according to claim 6, wherein the first attribute of the first object includes a product name of the first object.

10. The list generation method according to claim 6, wherein the classifying uses a normalized Levenshtein distance to classify the combination including the first image and the second image.

11. A computer-readable non-transitory recording medium storing a computer-executable program instructions that when executed by a processor cause a computer system to:
    extract a first feature from a first image of a plurality images, wherein the first image indicates a first object, and wherein the first feature is associated with a first attribute of the first object;
    extract a second feature from a second image of the plurality of images, wherein the second image indicates a second object, the second object is distinct from the first object, and the second feature is associated with a second attribute of the second object;
    classify a combination including the first image and the second image into a cluster of image data, wherein the first attribute and the second attribute are identical, and wherein a first real size of the first object is distinct from a second real size of the second object;

generating, based on the cluster of image data, a list of information describing attributes of objects with an identical attribute and in different real sizes;

identify, using a query image as an input, a third object included in the query image based on a group of images including images including objects with any of a plurality of attributes;

update, based on the first real size of the first object in the list, a size information of the third object with the first real size of the first object, wherein the third object is classified into the cluster of image data based on a third attribute of the third object being identical to the first attribute of the first object;

determine, based on the query image including three or more query objects, for each of the query objects of the query image, an actual dimensional ratio based on a size of a query object in the query image and the size information of the third object; and determine, based on the actual dimensional ratio, a real size of the query object included in the query image.

12. The computer-readable non-transitory recording medium according to claim 11, wherein the first attribute is based at least on either an image feature or a textual feature associated with the first object in the first image, and the cluster includes the first image regardless of a difference between the first real size and the second real size.

13. The computer-readable non-transitory recording medium according to claim 12, wherein the list further includes data representing a predetermined size of the first object and identification information associated with the first image.

14. The computer-readable non-transitory recording medium according to claim 7,
wherein the first attribute of the first object includes a product name of the first object, and
wherein the classifying uses a normalized Levenshtein distance to classify the combination including the first image and the second image.

* * * * *